United States Patent
Lindström et al.

(10) Patent No.: US 12,304,570 B2
(45) Date of Patent: May 20, 2025

(54) SYSTEM AND METHOD FOR COUNTERACTING CABIN VIBRATIONS

(71) Applicant: Volvo Truck Corporation, Gothenburg (SE)

(72) Inventors: Anders Lindström, Öjersjö (SE); Inge Johansson, Mölnlycke (SE); Sachin Janardhanan, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 236 days.

(21) Appl. No.: 18/022,295

(22) PCT Filed: Aug. 28, 2020

(86) PCT No.: PCT/EP2020/074097
§ 371 (c)(1),
(2) Date: Feb. 21, 2023

(87) PCT Pub. No.: WO2022/042852
PCT Pub. Date: Mar. 3, 2022

(65) Prior Publication Data
US 2023/0312025 A1    Oct. 5, 2023

(51) Int. Cl.
*B62D 33/00* (2006.01)
*B60L 15/20* (2006.01)
(Continued)

(52) U.S. Cl.
CPC .......... *B62D 33/0604* (2013.01); *B60L 15/20* (2013.01); *B60K 7/0007* (2013.01)

(58) Field of Classification Search
CPC .... B62D 33/0604; B60L 15/20; B60K 7/0007
See application file for complete search history.

(56) References Cited

U.S. PATENT DOCUMENTS

2012/0101691 A1*  4/2012  Otsuka ............... F02D 11/105
                                              701/48
2013/0264455 A1*  10/2013  Robbins ............. B60N 2/501
                                              296/190.07
(Continued)

FOREIGN PATENT DOCUMENTS

CN      102143880 A  *  8/2011  .......... B60K 7/0007
CN      105936273 A      9/2016
(Continued)

OTHER PUBLICATIONS

Intention to Grant for European Patent Application No. 20764635.7, mailed Mar. 25, 2024, 28 pages.
(Continued)

*Primary Examiner* — Peter D Nolan
*Assistant Examiner* — Peter Y Ning
(74) *Attorney, Agent, or Firm* — Withrow & Terranova, PLLC

(57) ABSTRACT

The invention relates to a system for counteracting cabin vibrations in a cabin of a vehicle in motion. The system comprises a sensor for measuring a current lateral velocity of the cabin when the cabin is vibrating in the lateral direction of the vehicle, and a control unit configured to receive an input signal from the sensor, said input signal representing a value of the measured lateral velocity of the cabin. The control unit is configured to compare the value of the measured lateral velocity with a reference value and to transmit, based on the comparison, command signals for applying a torque to at least one of the wheels of vehicle. The invention also relates to a method for counteracting cabin vibrations when a driver is driving the vehicle.

17 Claims, 3 Drawing Sheets

(51) Int. Cl.
   *B62D 33/06*          (2006.01)
   *B60K 7/00*           (2006.01)

(56)              References Cited

U.S. PATENT DOCUMENTS

2014/0058606  A1*   2/2014   Hilton ................ B60G 17/0157
                                                              701/22
2017/0368897  A1*  12/2017   Brickley ............... B60W 50/14
2019/0338842  A1   11/2019   Velazquez Alcantar et al.

FOREIGN PATENT DOCUMENTS

CN      106364367 B   *   7/2018
DE      102019004087 A1 * 1/2020
EP        1628851 B1  *   2/2008   ........... B60K 7/0007
EP        3339067 A1  *   6/2018   ......... B60G 17/0155
FR        2908350 A1  *   5/2008   ......... B60G 17/0162
KR      20100059564 A *   6/2010
KR      20110139454 A *  12/2011
KR      20140060368 A *   5/2014
KR      20160038414 A     4/2016

OTHER PUBLICATIONS

International Search Report and Written Opinion for International Patent Application No. PCT/EP2020/074097, mailed Nov. 20, 2020, 13 pages.

* cited by examiner

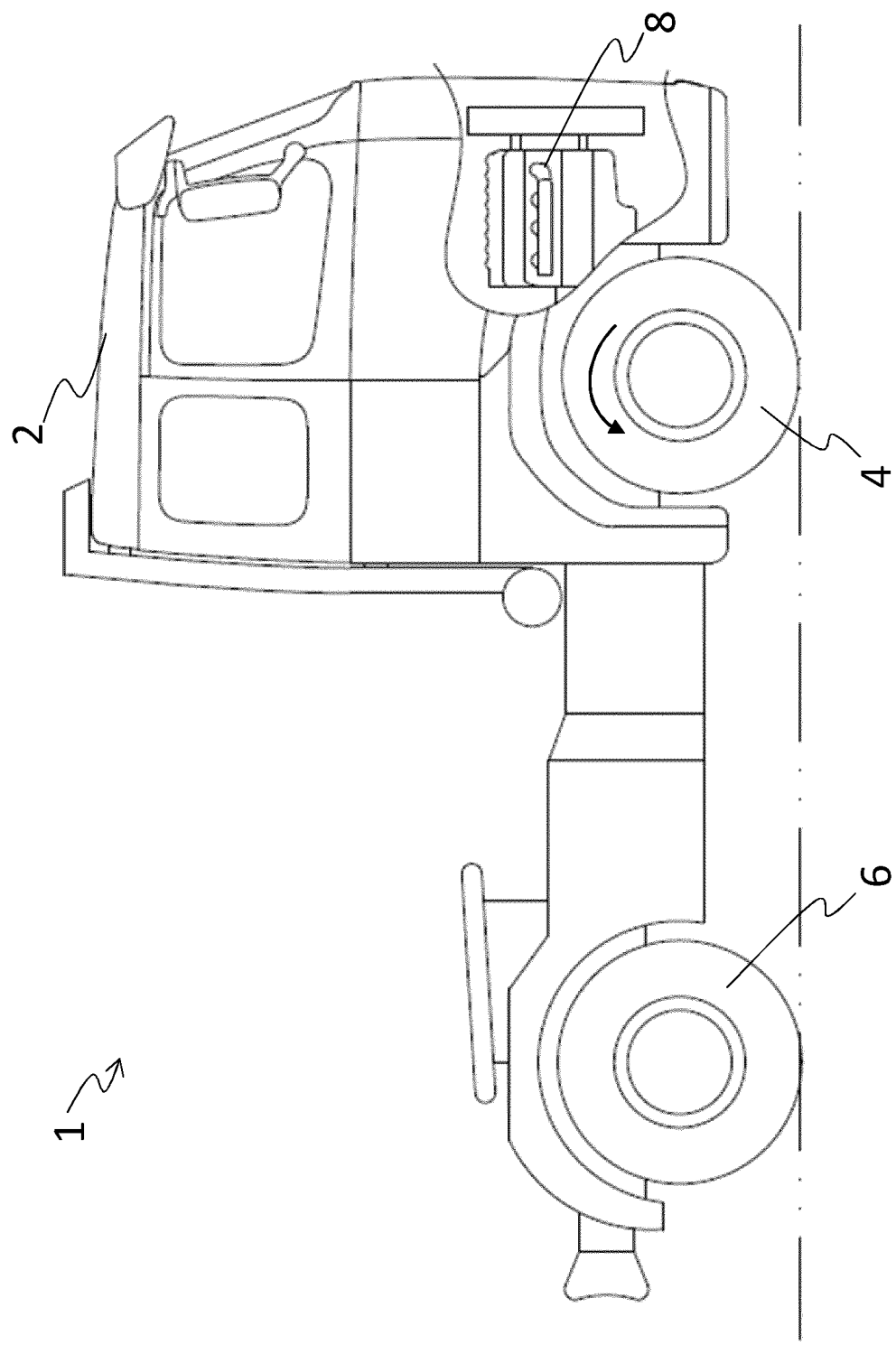

SYSTEM AND METHOD FOR COUNTERACTING CABIN VIBRATIONS

This application is a 35 USC 371 national phase filing of International Application No. PCT/EP2020/074097, filed Aug. 28, 2020, the disclosure of which is incorporated herein by reference in its entirety.

TECHNICAL FIELD

The invention relates to a system for counteracting cabin vibrations in a cabin of a vehicle in motion. The invention also relates to a vehicle comprising such a system. The invention further relates to a method for counteracting cabin vibrations in a cabin when a driver is driving the vehicle. The invention also relates to a computer program, a computer readable medium and a control unit performing the steps of the method.

The invention can be applied in heavy-duty vehicles, such as trucks, buses and construction equipment. Although the invention will mainly be described with respect to a truck, the invention is not restricted to this particular vehicle, but may also be used in other vehicles such as passenger cars.

BACKGROUND

Vehicles tyres should ideally be perfectly round. However, in reality, when a brand new vehicle leaves the factory, one or more of its tyres is/are often non-uniform to at least some extent. An expression used for not perfectly round tyres is "tyre run out". Even if a tyre is perfectly round when the vehicle leaves the factory, tyre run out may develop over time simply by driving the vehicle.

A tyre run out may be of the first order or second order. A first order tyre run out is generally caused by non-uniformity of the tyre as a whole. A second order tyre run out is generally caused by local irregularities along the tyre. When the vehicle is driven at a high enough speed, such as over 50 km/h, tyre run out may cause discomfort for a driver. In particular for a driver sitting in a cabin of a truck, if the tyre run out is large enough, it will be perceived as vibrations in the cabin.

It would be desirable to counteract such vibrations, and to reduce or even eliminate any discomfort perceived by the driver.

Indeed, it would be desirable to at least to some extent reduce discomfort felt by the driver also if cabin vibrations are caused by other reasons than tyre run out, for instance cabin vibrations caused by the vehicle travelling on an uneven road surface.

SUMMARY

An object of the invention is to provide a system and a method for counteracting cabin vibrations in order to at least partly reduces potential discomfort that may otherwise be perceived by a driver. This and other objects, which will become apparent in the following disclosure, are accomplished by a system and a method according to the accompanying independent claims.

According to a first aspect of the invention, there is provided a system for counteracting cabin vibrations in a cabin of a vehicle in motion, the system comprising:
  a sensor for measuring a current lateral velocity of the cabin when the cabin is vibrating in the lateral direction of the vehicle,
  a control unit configured to receive an input signal from the sensor, said input signal representing a value of the measured lateral velocity of the cabin, wherein the control unit is configured to:
    compare the value of the measured lateral velocity with a reference value, and
    transmit, based on the comparison, command signals for applying a torque to at least one of the wheels of vehicle.

The invention is based on the realization that by applying a torque to at least one of the wheels of the vehicle when a measured lateral velocity of the cabin reaches or exceeds a reference velocity, the vehicle will be less sensitive to variations in tyre run out, and thus the risk of driver discomfort may be reduced. The reference velocity or reference value for a particular vehicle may suitably be empirically determined. For instance, test persons may be subjected to different lateral cabin velocities and then give feedback on any discomfort perceived at different lateral velocities. By using a sensor in order to detect a current lateral velocity, an early countermeasure may be taken to avoid induced vibrations that may cause discomfort for the driver. Thus, by applying a torque to at least one of the wheels of the vehicle, the lateral velocity (and thus the vibrations) of the cabin may be appropriately controlled. Because of tyre run out, the tyre may tend or repeatedly "try" to turn in a direction away from the desired steering direction, which will be experienced as vibrations in the cabin. By applying a torque a "counter-steering" can be achieved, thus counter-acting the vibrations.

Typically, a discomfort may arise at cabin vibrations of 4-20 Hz, i.e. the cabin moves from left to right, and then back to left at 4-20 times per second. As an example, a first order tyre run out may result in a frequency of approximately 4-10 Hz, while a second order tyre run out may result in a frequency of approximately 8-20 Hz. The system may also be used for counteracting general road excited vibrations, at frequencies of 4-20 Hz. Typical velocities that may induce discomforting cabin vibrations may be in the range of 50-110 km/h.

A vehicle is normally defined by a geometrical roll axis, which extends in the longitudinal direction of the vehicle, i.e. the normal driving direction. A vehicle is also defined by a geometrical pitch axis extending in the lateral or transverse direction of the vehicle, i.e. from left to right or vice versa. Furthermore, a vehicle is defined by a yaw axis extending in the vertical direction, i.e. from the ground and up through the vehicle. Together, the roll axis, the pitch axis and the yaw axis form orthogonal coordinate axes. The sensor in the inventive system is used for measuring a lateral velocity of the cabin, i.e. a velocity of the cabin which is in the direction of or parallel with the direction of the geometrical pitch axis. The wheel axles also extend in parallel with the pitch axis, i.e. in lateral directions, from left to right, or vice versa.

The control unit may communicate with the sensor by wire, or wireless. The command signals may be sent to actuators or directly to individual components at each wheel, such as small electric motors or brake valves associated with a respective wheel. The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The command signals for applying the torque may suitably be commands for repeated application of torque, such as repeated micro-brakes, or micro-accelerations, which may occur in parallel with the normal operation (normal acceleration or service braking) of the vehicle. Accordingly, the driver may operate the vehicle as normal, suitably without noticing the torques applied by system. Such repeated application of torque, may for instance be at substantially the same frequency as the vibration frequency of the cabin.

The control unit may suitably receive input signals continuously when a driver is driving the vehicle, and may thus over time provide command signals representative of different torque values. It is also conceivable that when the control unit, based on the compared the measured value and the reference, has transmitted a torque command signal, the control unit will then continue making comparisons. Thus, if the initially applied torque did not counteract the cabin vibrations adequately enough, then the control unit may send command signals representative of other torque values, until the control unit determines, based on said comparison, that no command signal needs to be transmitted, i.e. no compensating/counteracting torque is presently necessary.

According to at least one exemplary embodiment, the command signals are command signals for applying a differential torque to the left and right wheels of a common axle, such as a front steered axle. This is advantageous since the non-uniform tyres will most often be non-uniform in different manners (or one tyre may be substantially uniform while the other is non-uniform). The differential torque applied to the two wheels of a common axle may be achieved by applying a positive torque to one of the tyres and a negative torque to the other one of the tyres. In other instances, the differential torque may be achieved by applying a positive torque to the left wheel and a different positive torque to the right wheel. In yet another instance, the differential torque may be achieved by applying a negative torque to the left wheel and a different negative torque to the right wheel. Thus, generally speaking, the differential torque may be achieved by applying a first torque to one of the two wheels of a common axle, and to apply a second torque to the other one of the two wheels, wherein the value of the first torque and second torque are different. It should, however, be understood that a differential torque is also achieved if the system applies a torque to only one of the wheels, while not applying any torque to the other wheel.

As mentioned above, the differential torque may suitably be applied to the wheels of a front steered axle. One reason for this is that tyre run out at the front steered axle may often have a greater effect on cabin vibrations than tyre run out at axles rear of the cabin.

It should, however, be understood that the invention may be implemented to instead, or additionally, apply a differential torque to other axles then a front steered axle.

According to at least one exemplary embodiment, said differential torque is proportional to the difference between the measured value and the reference value. Thus, the more the measured value exceeds the reference value, the higher differential torque will be commanded by the control unit. Suitably, the control unit may iterate the torque values commanded by means of the command signals. For instance, the control unit may be configured to detect that a differential torque should be applied (due to too high lateral cabin velocity) and will apply a differential torque, such as a first torque to the left wheel and a second torque to the right wheel of the common axle. If the counteraction is not adequate enough, the control unit may change the first and second torque, but keep the difference, i.e. differential torque remains the same but the distribution between left and right wheel is regulated/iterated until an adequate counteraction is achieved. The applied differential torque may, for instance, be in the range of 1-500 Nm.

In other exemplary embodiments the control unit may operate differently. For instance, if the difference between the measured value and the reference value is relatively high, then initially the control unit will command a relatively high differential torque. In response to the applied torque, the difference between the measured value and the reference value will decrease, and thus, the control unit may decide to command a lower differential torque, to further reduce the lateral velocity of the cabin.

According to at least one exemplary embodiment, the sensor is configured to measure the lateral velocity of the cabin relative to any lateral velocity of a chassis of the vehicle. Since the cabin is suspended to the chassis, a measurement of the lateral velocity relative to the chassis will provide a more relevant value than the lateral velocity relative to the ground, for instance when the vehicle changes lanes or performs other lateral movements.

According to at least one exemplary embodiment, the sensor comprises an accelerometer. The output of the accelerometer may be integrated over time to provide a value of the velocity. The accelerometer may, for instance, be of the piezoelectric type.

According to at least one exemplary embodiment, the control unit is further configured to calculate said torque to be applied based on the current longitudinal acceleration of the vehicle. This may be used for fine-tuning. A vehicle acceleration signal may thus be used to find if the vehicle is accelerating or decelerating and may act as a redundancy signal. Thus, if the longitudinal acceleration affects the sensor input, this may be taken into account. The control unit may be configured to avoid providing the counter-acting torque during acceleration. Similarly, the steering angle and the vehicle speed may be input parameters that may be used for fine-tuning.

According to at least one exemplary embodiment, the control unit is configured to control said torque to be applied by overlaying the torque over the normal braking of the wheels using conventional service brakes. With a suitable implementation of the control unit, it is possible to also reduce brake-induced cabin vibrations, by overlaying an electric differential torque without affecting the performance of the braking with service brakes. The electric differential torque may suitably be applied by means of electric motors, such as one electric motor for each wheel on which torque is to be applied. This is at least partly reflected in the following exemplary embodiment.

Thus, according to at least one exemplary embodiment, the system further comprises a first electric motor operatively connectable to a left wheel of an axle of the vehicle, and a second electric motor operatively connectable to a right wheel of the axle, wherein each one of said first and second electric motors are configured to receive said command signals transmitted by the control unit, for applying the commanded torque to the respective wheel. By having individual electric motors associated with the wheels an accurate and efficient control of the applied differential torque may be achieved. Similar to what has previously been explained in this disclosure, the first electric motor may, for instance, apply a positive torque (i.e. accelerating) to its associated wheel, while the second electric motor applies a negative torque (i.e. braking) to its associated wheel, or vice versa. Alternatively, the control unit may determine to command both the first and the second electric motors to provide a positive torque, but at different magnitudes (for instance, higher positive torque by the first electric motor, and lower positive torque by the second electric motor, or vice versa). Alternatively, the control unit may determine to command both the first and the second electric motors to provide a negative torque, but at different magnitudes (for instance, higher negative torque by the first electric motor, and lower negative torque by the second electric motor, or vice versa).

It should be understood that other types of torque generating arrangements may be provided. For instance, in some exemplary embodiments, instead of (or in addition to) the electric motors, the system may comprise individually controlled brake valves associated with respective wheels, such as the wheels of a front steered axle.

According to at least one exemplary embodiment, said control unit is configured to distinguish between a first and a second order tyre run out, wherein said torque to be applied is higher for counteracting second order tyre run out than for counteracting first order run out. This is advantageous as the control unit will adapt the torque to the type of vibrations present in the cabin. It should be understood that the control unit may also compensate for a tyre having both a first and a second order tyre run out. The control unit may, for instance, command an application of repeated micro-brakes or micro-accelerations (i.e. short activations, like pulses). The control unit may, for instance, command one magnitude of torque to be applied at a first frequency to compensate for a first order tyre run out and another magnitude of torque at a second frequency to compensate for a second order tyre run out. In other exemplary embodiments the control unit may command the same torque to be applied to compensate for both first and second order tyre run out of a wheel.

According to a second aspect of the invention, there is provided a vehicle comprising a system according to the first aspect, including any embodiment thereof. The advantages of the vehicle of the second aspect are largely analogous to those of the system of the first aspect, including any embodiment thereof.

According to an exemplary embodiment, the vehicle has a front steered axle, wherein the system is configured to apply said torque to at least one of the wheels of a front steered axle of the vehicle. Suitably, a differential torque may be applied, as explained above, by providing torque to both wheels.

According to a third aspect of the invention, there is provided a method for counteracting cabin vibrations in a cabin when a driver is driving the vehicle, the method comprising:
measuring a current lateral velocity of the cabin,
comparing the measured current lateral velocity with a reference velocity, and
applying, based on the difference between the lateral velocity and the reference velocity, a torque to at least one of the wheels of the vehicle.

The advantages of the method of the third aspect are largely analogous to those of the system of the first aspect, including any embodiment thereof. To avoid lengthy repetition of features, only some exemplary embodiments of the method will be discussed below, although the skilled person will realize that other embodiments are also conceivable and encompassed by the scope of the claims.

According to at least one exemplary embodiment, the method comprises applying a differential torque to the left and right wheels of a common axle, such as the front steered axle.

According to at least one exemplary embodiment, said differential torque is proportional to the difference between the lateral velocity and the reference velocity.

According to a fourth aspect of the invention, there is provided a computer program comprising program code means for performing the steps of the method of the third aspect, including any embodiment thereof, when said program is run on a computer.

According to a fifth aspect of the invention, there is provided a computer readable medium carrying a computer program comprising program code means for performing the steps of the method of the third aspect, including any embodiment thereof, when said program is run on a computer.

According to a sixth aspect of the invention there is provided a control unit for controlling a torque to be applied to a wheel of a vehicle, the control unit being configured to perform the steps of the method of the third aspect, including any embodiment thereof.

Although this disclosure is mainly focused on compensating for vehicle induced vibrations in the form of tyre run out, it should be understood that the various aspects of the invention may be implemented to counteract cabin vibrations caused by other reasons, such as by uneven road surface.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 1 illustrates a vehicle which may be provided with the inventive system, in accordance with at least one exemplary embodiment of the invention.

DETAILED DESCRIPTION OF EXAMPLE EMBODIMENTS OF THE INVENTION

Figure 3:
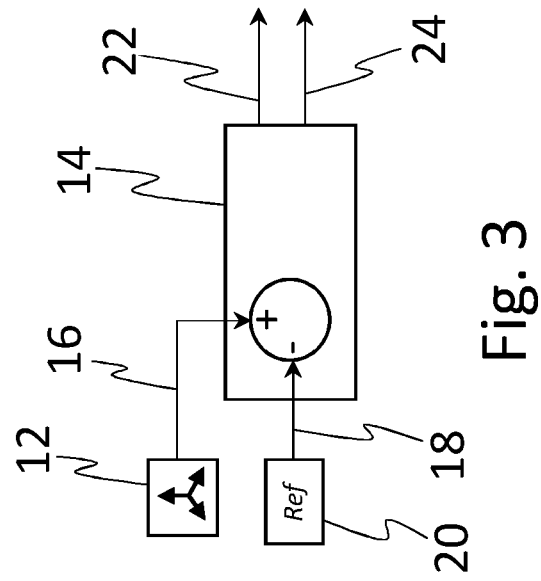
FIG. 3 is a schematic diagram illustrating the function of the control unit, in accordance with at least one exemplary embodiment of the invention.

FIG. 1 illustrates a vehicle 1, which may be provided with the inventive system, in accordance with at least one exemplary embodiment of the invention. Although the vehicle 1 is illustrated in the form of a truck, other types of vehicles, such as busses, construction equipment, trailers or passenger cars may be provided with the inventive system.

The truck (vehicle) 1 comprises a cabin 2 in which a driver may operate the vehicle 1. The vehicle 1 comprises a number of road wheels, herein illustrated as one front pair of wheels 4 and one rear pair of wheels 6. It should, however, be understood that in other embodiments there may be a different number of wheels, such as two pairs of rear wheels.

The rotation of the wheels are accomplished by means of a suitable propulsion system, herein illustrated, by way of example, as an internal combustion engine system 8.

However, it should be understood that other alternatives, such as fuel cells, traction batteries, etc. are conceivable sources of energy for driving the vehicle 1.

Figure 2:
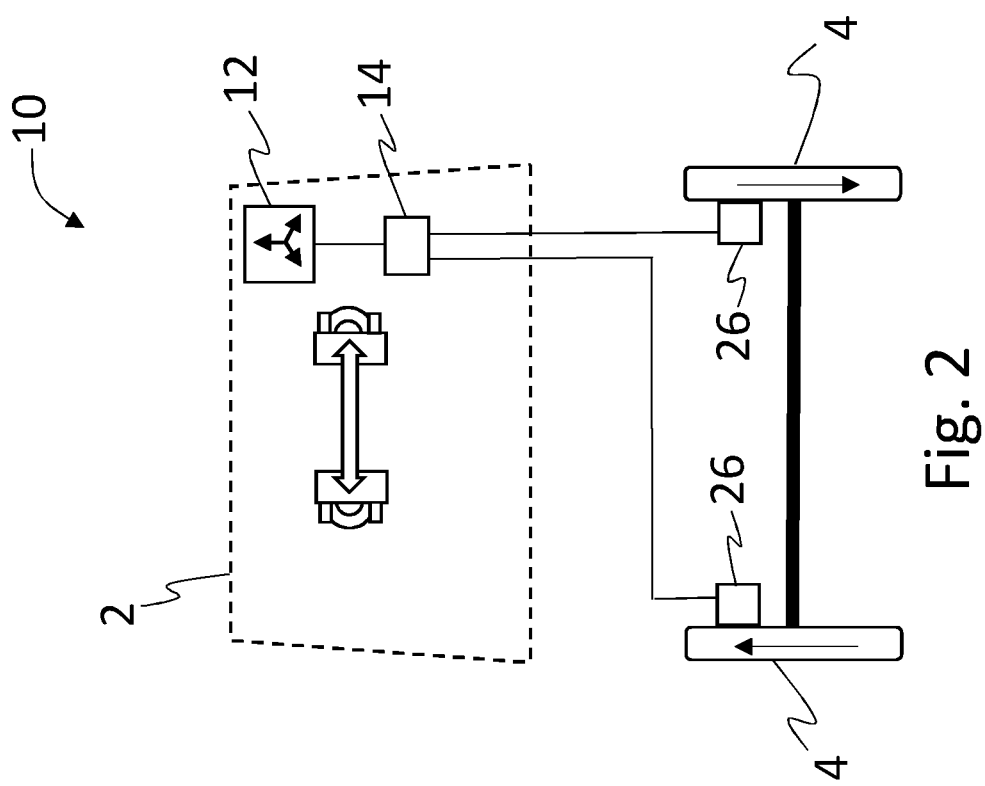
FIG. 2 is a schematic illustration of the system according to at least one exemplary embodiment of the invention.

FIG. 2 is a schematic illustration of the system 10 according to at least one exemplary embodiment of the invention. The system 10 is for counteracting cabin vibrations in a cabin 2 of a vehicle in motion, i.e. when a driver is driving the vehicle, and in particular lateral cabin vibrations. The cabin 2 is very schematically represented in FIG. 2 by a trapezoid of dashed lines. The presence of cabin vibrations in the lateral direction is schematically represented by the double arrow. Furthermore, in FIG. 2 a pair of wheels 4 are schematically illustrated. The wheels 4 may, for instance be a pair of front steered wheels corresponding to those of the vehicle 1 shown in FIG. 1. However, the inventive system may, as already explained, be implemented also in connection with other wheels, such as rear wheels.

The system comprises a sensor 12 and a control unit 14. The sensor 12 may suitably be arranged on the inside of the cabin 2, as illustrated in FIG. 2. However, it is equally conceivable to attach it to an outside of the cabin 2, or to integrate it in the cabin structure, as long as it is possible to derive information from the sensor 12 regarding the lateral velocity of the cabin 2. Similarly, although the control unit 14 is illustrated as being provided inside the cabin 2, it should be understood that it can be provided anywhere on the vehicle as long as it can communicate with the sensor 12 and with any device that is used for applying the torque commanded by the control unit 14.

To counteract cabin vibrations, which may be induced by tire run out or by uneven road surface, the sensor 12 is provided in the system 10 in order to measure a current lateral velocity of the cabin 2. Thus, when the cabin 2 is vibrating in the lateral direction of the vehicle, the measurements made by the sensor 12 will be used for determining the lateral velocity of the cabin 2. It should be understood that the sensor 12 does not necessarily measure the lateral velocity as such, but it should be able to provide information from which the velocity may be derived. For instance, the sensor 12 may comprise an accelerometer, which may thus provide information on the acceleration (in particular the lateral acceleration) of the cabin 2. By integrating the acceleration over time, the velocity is obtainable.

The sensor 12 sends input signals to the control unit 14. The input signals represent a value of the measured lateral velocity of the cabin 2. The control unit 14 compares the this measured value with a reference value. This is illustrated in FIG. 3, which will now be discussed.

FIG. 3 is a schematic diagram illustrating the function of the control unit 14, in accordance with at least one exemplary embodiment of the invention. As illustrated in FIG. 3, the control unit 14 is configured to receive an input signal 16 from the sensor 12. The input signal represents a value of the measured lateral velocity of the cabin. The control unit 14 compares said value with a reference value 18. The reference value 18 may, for instance, be stored in an electronic memory 20 associated with or forming part of the control unit 14. Based on the comparison, the control unit 14 may transmit command signals 22, 24 for applying a torque to at least one of the wheels of the vehicle. As illustrated in FIG. 3, the control unit 14 may transmit one command signal 22 associated with the left wheel, and another command signal 24 associated with the right wheel. As previously explained in this disclosure, a differential torque may be applied in different ways. For instance, the applied torque may be positive torque on both wheels, or it may be negative torque on both wheels, or as illustrated in FIG. 2, it may be positive on one of the wheels but negative on the other wheel.

Turning back to FIG. 2, the system 10 may suitably comprise one or more torque-generating devices for executing the command issued by the control unit 14. Such torque generating device may comprise different types of actuators, for instance including or connected to electric motors. Other conceivable torque-generating devices may be individual brake valves.

By way of example, the system 10 may thus comprise electric motors; in FIG. 2 illustrated as one individual electric motor 26 associated with each one of the wheels 4. Thus, the command signals 22, 24 in FIG. 3 may be transmitted to such electric motors 26. The torque applied by the electric motors 26 to the respective wheel 4 is suitably applied independently of other torques applied due to the driver pressing the accelerator pedal or the brake pedal. Thus, the two electric motors 26 (or any other torque-generating devices used with the system) are suitably decoupled form the drive shaft of the vehicle and the brake of the vehicle. It should accordingly be understood that the torque that is applied in response to the command signals 22, 24 from the control unit 14, may be applied by overlaying the torque over the normal braking of the wheels 4 using conventional service brakes. By application of the torque to at least one of the wheels 4, the cabin vibrations will be counteracted, thereby reducing risk of discomfort for the driver.

By way of example, FIG. 2 illustrates one way of applying a differential torque to the left and right wheels 4 of a common axle. As illustrated by the arrows at the wheels 4, one points downwardly, representing a positive torque, while the other one points upwardly, representing a negative torque. Suitably, the differential torque may be proportional to the difference between the value measured by the sensor and the reference value. This exemplary application of torque is also illustrated in FIG. 1 by the curved arrow, thus showing that a negative torque is being applied to the right front wheel 4.

The control unit 14 may comprise or may be comprised in a processing circuitry. The processing circuitry may include a microprocessor, microcontroller, programmable digital signal processor or another programmable device. The processing circuitry may also, or instead, include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry (or generally discussed as "processing circuitry") may be at least partly integrated with the control unit.

Figure 4:
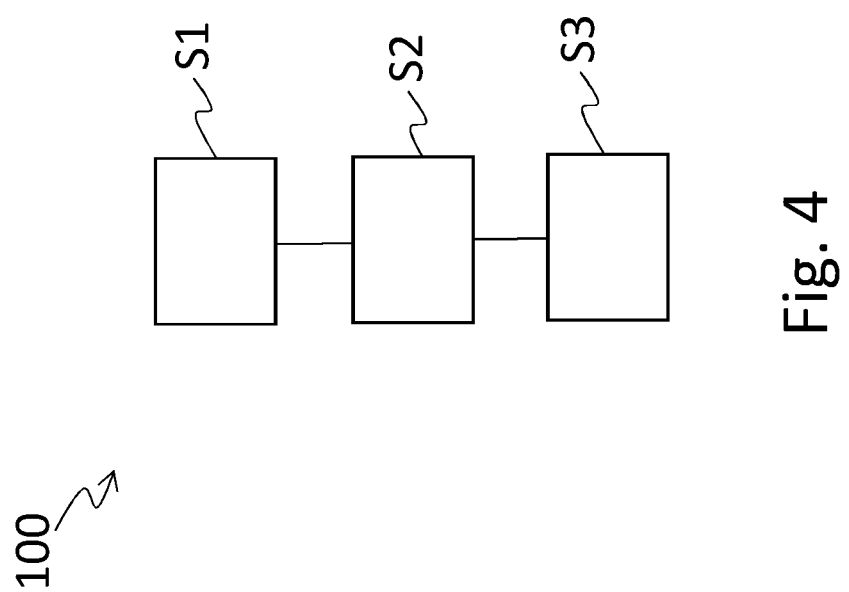
FIG. 4 is a schematic illustration of a method according to at least one exemplary embodiment of the invention.

FIG. 4 is a schematic illustration of a method 100 according to at least one exemplary embodiment of the invention. More specifically, the method 100 is for counteracting cabin vibrations in a cabin when a driver is driving the vehicle. The method 100 comprises:

in a first step S1, measuring a current lateral velocity of the cabin, in a second step S2, comparing the measured current lateral velocity with a reference velocity, and in a third step S3, applying, based on the difference between the lateral velocity and the reference velocity, a torque to at least one of the wheels of the vehicle.

Applying said torque may suitably comprise applying a differential torque to the left and right wheels of a common axle, such as the front steered axle. Said differential torque is suitably proportional to the difference between the lateral velocity and the reference velocity.

It is to be understood that the present invention is not limited to the embodiments described above and illustrated in the drawings; rather, the skilled person will recognize that many changes and modifications may be made within the scope of the appended claims.

The invention claimed is:

1. A system for counteracting cabin vibrations in a cabin of a vehicle in motion, the system comprising:
   a sensor for measuring a current lateral velocity of the cabin when the cabin is vibrating in a lateral direction of the vehicle, and
   a control unit configured to receive an input signal from the sensor, the input signal representing a value of the measured lateral velocity of the cabin,
   wherein the control unit is configured to:
      compare the value of the measured lateral velocity with a reference value, and
      transmit, based on the comparison, command signals for applying a torque to at least one wheel of the wheels of the vehicle,
   wherein the torque is applied to the at least one wheel of the wheels of the vehicle based on the transmitted command signals.

2. The system of claim 1, wherein the command signals are command signals for applying a differential torque to left and right wheels of a common axle of the vehicle.

3. The system of claim 2, wherein the differential torque is proportional to a difference between the value of the measured lateral velocity and the reference value.

4. The system of claim 2, wherein the common axle comprises a front steered axle.

5. The system of claim 1, wherein the sensor is configured to measure the lateral velocity of the cabin relative to any lateral velocity of a chassis of the vehicle.

6. The system of claim 1, wherein the sensor comprises an accelerometer.

7. The system of claim 1, wherein the control unit is configured to control the torque to be applied to at least one wheel of the vehicle by overlaying the torque over normal braking of the wheels using conventional service brakes.

8. The system of claim 1, wherein the control unit is configured to distinguish between a first and a second order tire run out, wherein the torque to be applied to at least one wheel of the vehicle is higher for counteracting second order tire run out than for counteracting first order tire run out.

9. The system of claim 1, further comprising a first electric motor operatively connectable to a left wheel of an axle of the vehicle, and a second electric motor operatively connectable to a right wheel of the axle, wherein each of the first and the second electric motors are configured to receive the command signals transmitted by the control unit, for applying the torque to the respective left or right wheel.

10. A vehicle comprising the system of claim 1.

11. The vehicle of claim 10, wherein the system is configured to apply the torque to at least one wheel of the wheels of a front steered axle of the vehicle.

12. A method for counteracting cabin vibrations in a cabin of a vehicle having wheels when a driver is driving the vehicle, the method comprising:
   measuring a current lateral velocity of the cabin,
   comparing the measured current lateral velocity with a reference velocity, and
   applying, based on a difference between the measured current lateral velocity and the reference velocity, a torque to at least one wheel of the wheels of the vehicle.

13. The method of claim 12, wherein the vehicle comprises a common axle having left and right wheels, and the method further comprises applying a differential torque to the left and right wheels of the common axle.

14. The method of claim 13, wherein the differential torque is proportional to the difference between the measured current lateral velocity and the reference velocity.

15. The method of claim 13, wherein the common axle comprises a front steered axle.

16. A computer program product comprising a non-transitory computer readable medium having stored thereon a computer program comprising program code means for performing the method of claim 12 when the computer program is run on a computer.

17. A control unit for controlling a torque to be applied to a wheel of a vehicle, the control unit being configured to perform the method of claim 12.

* * * * *